(12) United States Patent
Park et al.

(10) Patent No.: US 7,266,448 B2
(45) Date of Patent: Sep. 4, 2007

(54) METHOD FOR SEARCHING RETURN PATH OF MOVING OBJECT FOR USE IN NAVIGATION SYSTEM

(75) Inventors: Chang Won Park, Seoul-si (KR); Moon Jeung Joe, Anyang-si (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 10/748,217

(22) Filed: Dec. 31, 2003

(65) Prior Publication Data
US 2004/0220729 A1 Nov. 4, 2004

(30) Foreign Application Priority Data
Jan. 2, 2003 (KR) .................... 10-2003-0000080

(51) Int. Cl.
*G01C 21/30* (2006.01)
(52) U.S. Cl. .............. 701/209; 701/210; 701/211; 340/988
(58) Field of Classification Search .......... 701/200, 701/201, 202, 207, 208, 209, 210, 211; 340/990, 340/988, 995.1–995.23
See application file for complete search history.

(56) References Cited
U.S. PATENT DOCUMENTS 5,684,696 A * 11/1997 Rao et al. .................. 701/25
5,911,775 A * 6/1999 Tanimoto .................. 701/210
6,784,832 B2 * 8/2004 Knockeart et al. ..... 342/357.13
6,812,888 B2 * 11/2004 Drury et al. ........... 342/357.13
6,909,398 B2 * 6/2005 Knockeart et al. ..... 342/357.14
6,968,272 B2 * 11/2005 Knockeart et al. .......... 701/210

* cited by examiner

*Primary Examiner*—Richard M. Camby
(74) *Attorney, Agent, or Firm*—Birch, Stewart, Kolasch & Birch, LLP

(57) ABSTRACT

A navigation system of the present invention provides a user of a moving object with a return path on an original driving path when the moving object deviates from the original driving path. A method for searching the return path of the moving object for use in the navigation system comprises the steps of: searching and storing an original driving path of the moving object, and guiding the moving object along the searched driving path; deciding whether the moving object is deviated from the driving path; when the moving object is deviated from the driving path, deciding a start point and return points for returning the moving object on the original driving path; after searching respective paths from the start point to the return points, deciding a shortest path as an optimum return path; and guiding the moving object to the original driving path along the decided return path.

10 Claims, 4 Drawing Sheets

METHOD FOR SEARCHING RETURN PATH OF MOVING OBJECT FOR USE IN NAVIGATION SYSTEM

This Nonprovisional application claims priority under 35 U.S.C. § 119(a) on Patent Application No(s). 2003-0000080 filed in Korea on Jan. 2, 2003, the entire contents of which are hereby incorporated by reference.

BACKGROUND OF THE INVENTION

1. Field of the Invention

The present invention relates in general to a navigation system, more particularly, to a method for searching a return path of a moving object (e.g., vehicle). Thus although the moving object deviates from its driving path and takes a different path, it can always return on the original driving path from a deviation point.

2. Discussion of the Background Art

In general, a navigation system detects a present position of a moving object on the basis of signals received from a plurality of GPS (Global Positioning System) satellites belonging to the US military GPS system, and signals detected by a plurality of sensors mounted on the moving object, including a gyro that detects traveling direction and a speed sensor that detects traveling speed, for example, and matches the detected present position of the moving object on a map data.

Also, using the present position information matched on the map data, the navigation system searches a driving path from the present position to a destination, and driving the moving object to the destination, along the searched driving path.

Particularly, to guide the moving object to the driving path originally set, the navigation system with the path searching and driving functions repeatedly confirms to which direction the moving object is traveling from the present position, and how much distance the moving object has been traveling. When the moving object strays off the driving path, returning the moving object on the original driving path is the most essential part of the path searching and guide functions of the system, to help a driver of the moving object to continue the travel.

When the moving object deviates from the driving path, a related art navigation system with the path searching and guide functions used to research a path from the present position to the destination, and guides the driver of the moving object to follow the researched path.

However, according to the related art system, the driver is not provided with a path connected to the original driving path, but a new driving path. In other words, the original driving path is simply replaced by the researched path.

Moreover, there are occasions when the system cannot search a path again even if the moving object strays off. For example, path searching of the moving object is sometimes done using a particular method. That is, suppose that path searching of the moving object has to be done by accessing to a traffic information center over a communication network However, if the present position of the moving object is in a communication blockage, the path searching cannot be done at this point. The driving path can be searched again only after the moving object is moved to a coverage area.

In addition, when the driver has paid to receive useful information on the original driving path, traffic information (i.e., traffic jam) and road works in progress, for example, the paid information cannot be reused, and the driver has to pay again to know a new driving path and any kind of useful information on the newly found path, only resulting in an increase of expense of travel to the driver.

SUMMARY OF THE INVENTION

An object of the invention is to solve at least the above problems and/or disadvantages and to provide at least the advantages described hereinafter.

Accordingly, one object of the present invention is to solve the foregoing problems by providing a method and device for searching a return path of a moving object for use in a navigation system, capable of returning the deviated moving object on a driving path originally set.

Another object of the present invention is to provide a method and device for searching a return path of a moving object for use in a navigation system, by obtaining a set of a plurality of return points that are distant by a predetermined distance from a deviation point and exist on a driving path, searching respective return paths from a start point of the deviated path to the plurality of return points, and deciding an optimum return path having a shortest distance.

Still another object of the invention is to provide a method and device for searching a return path of a moving object for use in a navigation system, enabling a driver of a moving object to return on an original driving path from a deviation point of the driving path originally set, along the searched return path, whereby the driver can continue travel along the original driving path.

The foregoing and other objects and advantages are realized by providing a method for searching the return path of the moving object for use in the navigation system, including the steps of: searching and storing an original driving path of the moving object, and guiding the moving object along the searched driving path; deciding whether the moving object is deviated from the driving path; when the moving object is deviated from the driving path, deciding a start point and return points for returning the moving object on the original driving path; after searching respective paths from the start point to the return points, deciding a shortest path as an optimum return path; and guiding the moving object to the original driving path along the decided return path.

Another aspect of the invention provides a navigation system, including: a GPS receiving means for receiving position data transmitted from a plurality of GPS satellites; a map data storing means for storing digital map data; a user input means; a display and a voice output means for providing a user of a moving object with a driving path; and a main control means for setting a driving path from a present position of the moving object to a destination on the basis of the GPS position data and the digital map data, storing the driving path, guiding the user to the driving path, and when the moving object is deviated from the driving path originally set, for searching and deciding a shortest optimum return path and guiding the user to the decided return path.

According to a preferred embodiment of the invention, to search a shortest return path, a moving object that is deviated from a driving path originally set is searched first, and using the moving object's deviation position from the driving path as a reference, a plurality of or a predetermined number of return points positioned adjacent to the deviation point by a predetermined multiple are decided. Among return paths that connect each of the return points to the deviation point, the shortest return path is selected.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a method for searching a return path of a moving object for use in a navigation system according to a preferred embodiment of the invention in reference to the accompanying drawings.

Figure 1:
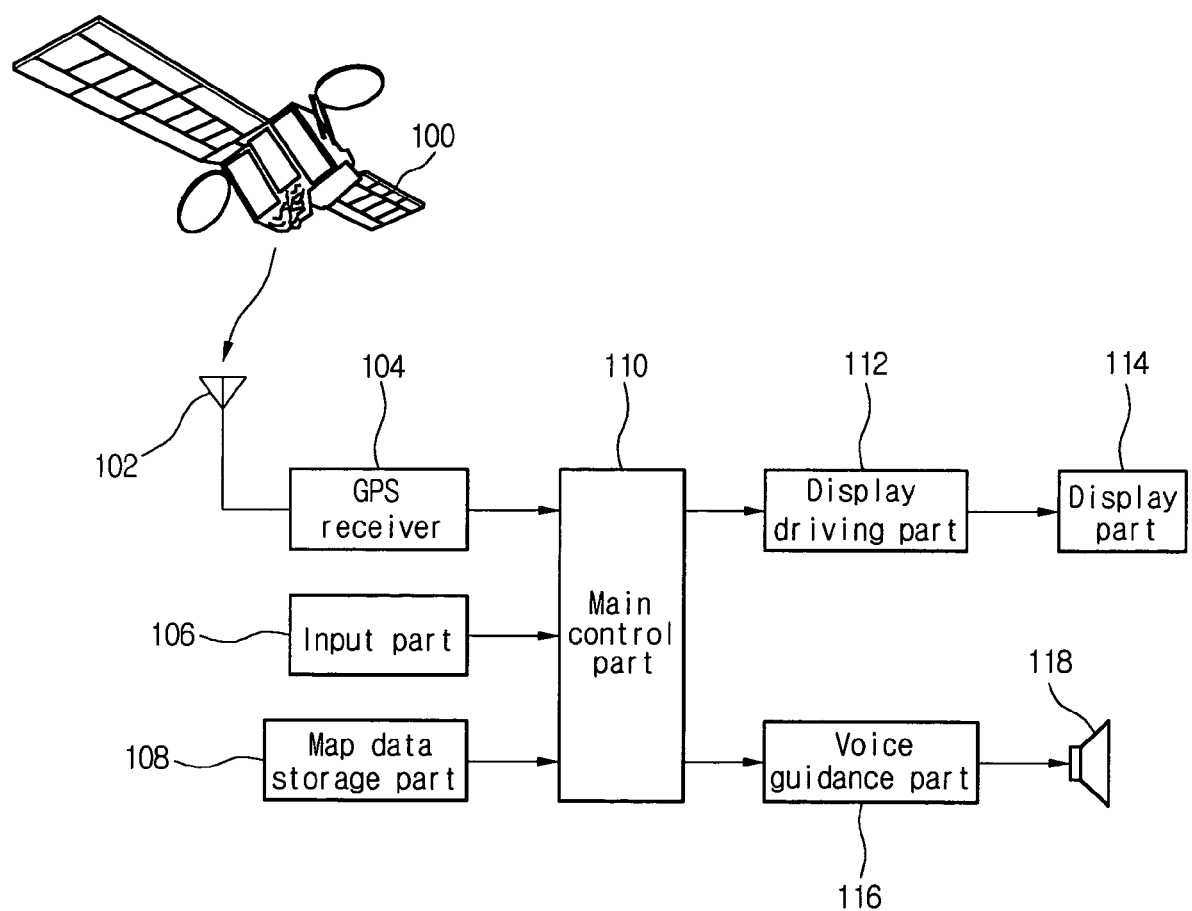
FIG. 1 is a block diagram illustrating a configuration of a navigation system in accordance with the present invention.

FIG. 1 illustrates the configuration of a navigation system to which the return path searching method of the present invention is applied.

Referring to FIG. 1, the navigation system includes a GPS receiver 104 for receiving position data transmitted from at least three GPS satellites 100 over an antenna 102, an input part 106 to which a destination of the moving object is input, under an operation of a user, a map data storage part 108 for storing map data in a storage medium like a compact disk, a main control part 110 for setting and storing a driving path from a present position of the moving object to a destination which is provided from the input part 106, for designating a guide object positioned on the driving path, and for controlling a travel guidance on the driving path from the position of the object, a display driving part 112 for displaying on a display part 114 map data and the present position of the moving object under control of the main control part 110, and a voice guidance part 116 for outputting a voice signal through a speaker 118, to guide the moving object to the driving path, under control of the main control part 110.

An operation of the navigation system having the above system configuration will now be discussed.

As shown in FIG. 1, when the moving object travels, a certain position data transmitted from a plurality of GPS satellites 100 is received to the GPS receiver 102, and then transmitted to the main control part 110. As an embodiment, the system can include sensors for detecting travel speed and direction of the moving object.

The main control part 110 decides or detects the present position of the moving object on the basis of a signal from the GPS receiver 102, and map matches the detected present position on the map data stored the map data storage part 108.

When the user (i.e. the driver) of the moving object inputs the destination to the input part 106, the main control part 110, referring to the map data stored in the map data storage part 108, searches a driving path from the present position of the moving object to the destination, displays the searched driving path on the display part 114 through the display driving part 112, and outputs guidance with the system voice through the speaker 118, notifying the driver the driving path to follow.

Also, the main control part 110 frequently confirms the present position of the moving object by using the signal from the GPS receiver 102 while guiding the moving object along the driving path, and finds out whether the moving object strays off the driving path. When the moving object strays off the driving path, a return path is searched.

Figure 2:
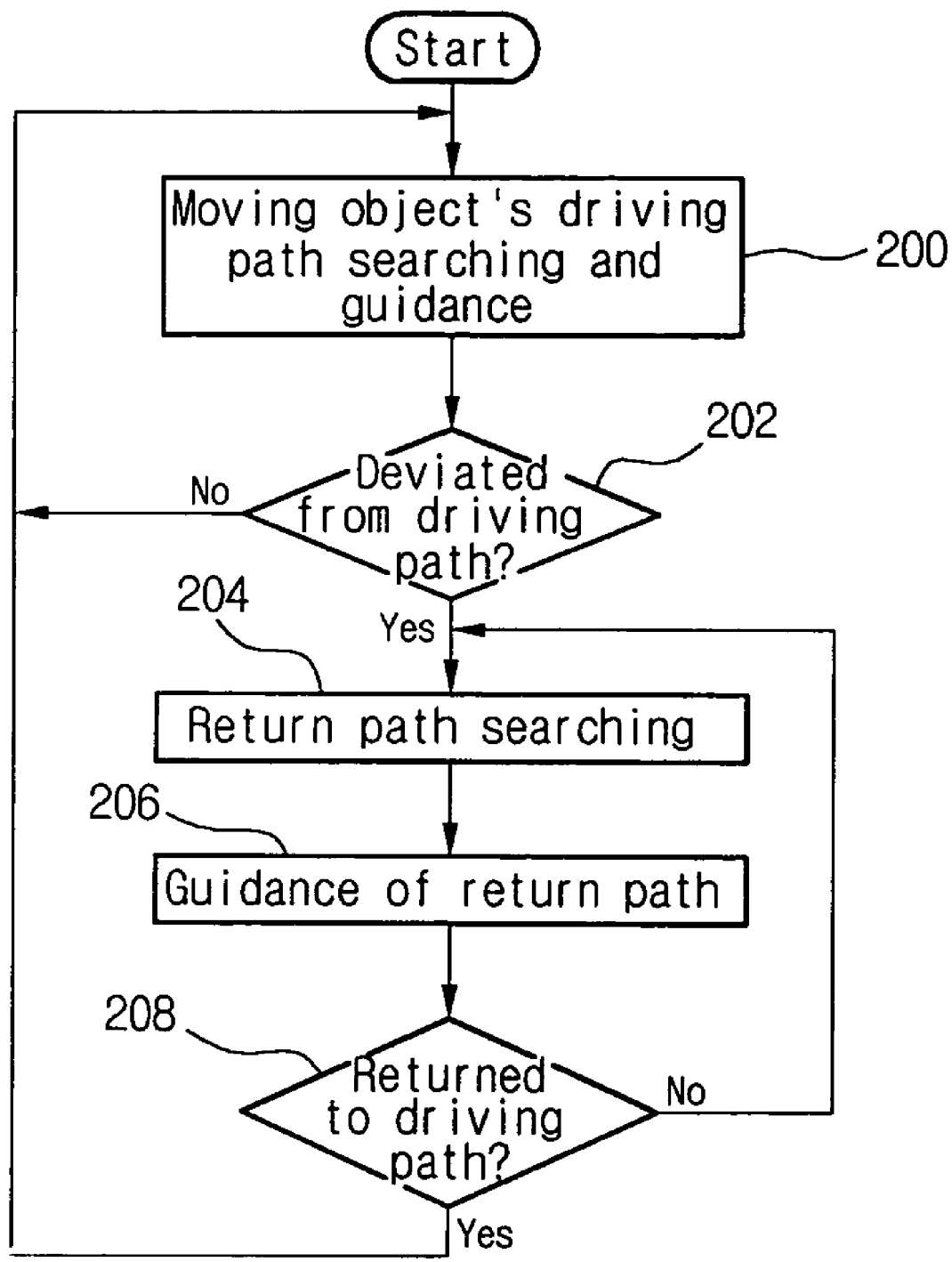
FIG. 2 is a flow chart describing a method for searching a return path of a removing object for use in a navigation system in accordance with the present invention.

FIG. 2 is a flow chart describing a method for searching a return path according to the present invention.

As shown in FIG. 2, the main control part 110 searches the driving path from the present position of the moving object to the destination, and ensures that the moving object follows the searched driving path by means of the display driving part 112 and the display part 114, and the voice guidance part 116 and the speaker 118 (S200).

On the basis of the signal from the GPS receiver 102, the main control part 110 decides whether the present position of the moving object is deviated from the driving path originally set (S202). As an embodiment, when the present position of the moving object is not found on the driving path, there is a high possibility to believe that the moving object is deviated from the track. To prevent the main control part 110 from concluding the deviation of the moving object due to communication and equipment troubles, the system receives GPS position data for a predetermined period of time, and concludes that the moving object is indeed deviated if the same conclusion is drawn more than a certain number of times.

On the other hand, when the moving object has not strayed off the driving path but is following the driving path, the main control part 110 performs the step 200 and continues to guide the moving object to follow the original path.

However, when it turns out that the moving object has deviated from the driving path, the main control part 110 searches a return path that the moving object can return (S204), and guides the searched return path (S206).

Further, the main control part 110 decides whether the moving object reaches a path (or a point) where the return path and the original driving path match with each other (S208), and repeats the process (i.e. S206 and S208) until the moving object returns on the driving path. When the moving object returns to the original driving path, the main control part 110 goes back to its role of driving path searching and guidance of the moving object (S208 and S200).

Figure 3:
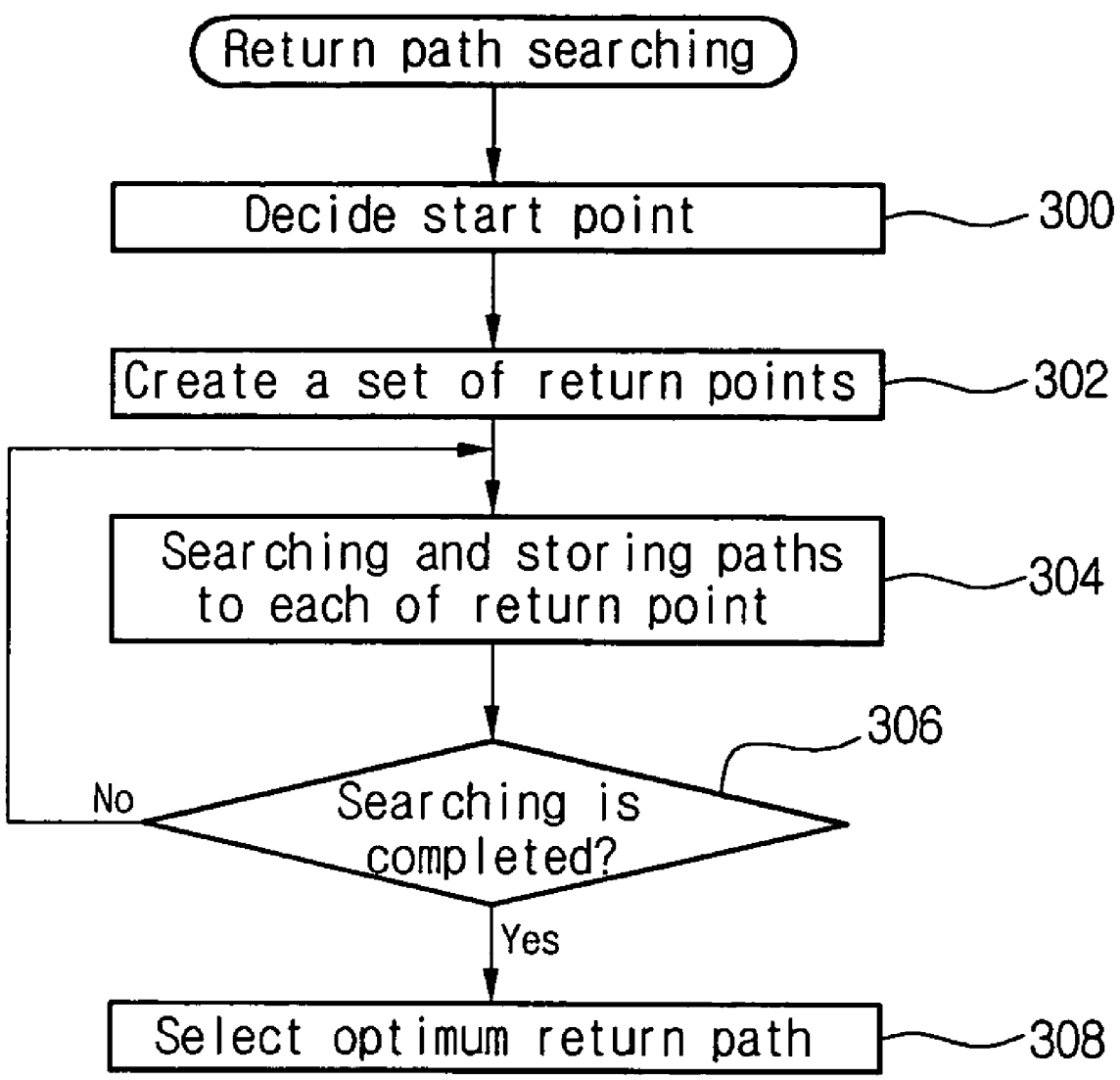
FIG. 3 is a signal flow chart describing a searching procedure of a return path in FIG. 2.
Figure 4:
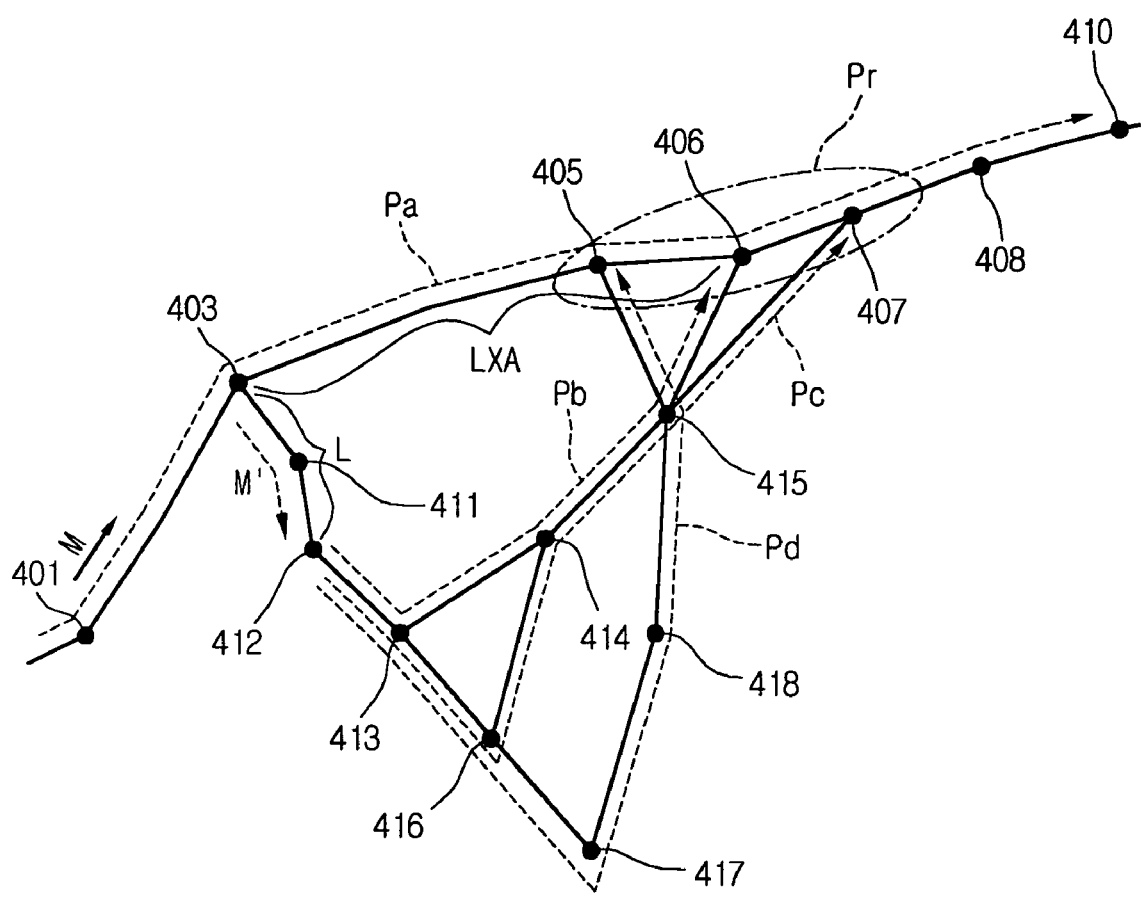
FIG. 4 is a diagram for describing a searching procedure of a return path in accordance with the present invention.

More details on the method for searching the return path are provided with reference to FIG. 3 and FIG. 4.

As illustrated in FIG. 3, the main control part 110 decides a start point of the return path for returning the moving object on the driving path (S300). According to an embodiment, the present position of the moving object provided by the GPS receiver 104, or a position the user of the moving object has input through the input part 106 becomes the start point of the return path.

Once the start point is decided in the step 300, a set of return points which the user can follow to return to the driving path from the start point (S302). Here, the set of the return points can be an optimum set that is selected among every possible set of return points.

For example, as depicted in FIG. 4, suppose that the moving object (M) is traveling along the driving path (Pa) originally set, and strays off a certain node 403, and that the deviated moving object (M') is now going to a direction of a node 412 via a node 411.

Practically, every node (401, . . . , 410) on the driving path (Pa) in FIG. 4 can be included in the set of return points.

When all these nodes (401, ..., 410) on the driving path (Pa) in FIG. 4 are included in the set of return points, an optimum return path from a start point 412 of the deviated moving object (M') to the driving path (Pa) can be calculated. However, since every path from the start point to all those nodes (401, ..., 410) should be tried out to finally decide the optimum return path, this method is too time consuming, and thus ineffective.

On the other hand, in case the last point, i.e. node 403, which the moving object (M) passed right before deviation from the driving path (Pa), is the only one included in the set of return points, the user can return to the driving path right away probably within a shortest time because no further return path-searching is needed. However, this method, although it seems quite effective, is not actually effective from the viewpoint of an absolute necessity of searching the return path because it is possible that there may be no proper return path from the present start point (node 412) to a corresponding node.

Accordingly, having the last-passing node 403 of the moving object (M) before it deviated from the driving path as a reference, a predetermined number of nodes (i.e. a part of nodes 405-410) located in front of the driving path is selected for the set of return points, in consideration of efficiency and effect under a given circumstance such as a travel distance after deviation from the path.

For example, in case that the moving object (M) traveled a distance (L) after deviating from the driving path. Then, predetermined multiples, say A×L, of the distance (L) (e.g., node 406) becomes a return point. In other words, using the last position or node (in this case, node 4030 right before the moving object has deviated from the path as a reference, the main control part 110 searches a position or a node (e.g., ode 406) that corresponds to a certain multiple of the deviated distance, and creates a set (Pr) of return pints (nodes 405, 406 and 407) lying adjacent to the searched positions (S302). Preferably, the set of return points should have at least one node, and the nodes in the set are multiples of the deviated distance. Here, 'A' is an offset constant, and the set of return points has more than one node existing on the driving path.

Even though the less the number of nodes included in the set (Pr) of return points, the faster the return path searching process can be done, there may be an occasion when there is no return path available. In addition, as the constant (A) is increased, the moving object approaches a node close-by the destination, so previously obtained valuable information about the original driving path become useless. Therefore, it is needed to carefully set the number of nodes to be included in the set of return points and the offset constant (A) in consideration of the searched return path and usage of information on the digitized map.

When the set of return points is created (S302), the main control unit 110 searches a path between the present position and respective return points on the digitized map and stores the searched paths (S304), and completes its searching process involving every return point (S306).

Out of the searched and stored return paths, an optimum return path is selected (S308). In an embodiment of the present invention, the optimum return path is a shortest path that the moving object can return from the present position to the driving path within a shortest time. In addition, to optimize the return path, the deviated distance can be subtracted from a residual distance from the last position on the driving path (Pa) before the deviation to the destination, and then the offset constant or the number of return points can be decided using the residual distance of the driving path as a reference.

In FIG. 4, given that the nodes 405, 406 and 407 belong to the set of the return points, and that the start point is the node 412, Pb, Pc, and Pd are searchable return paths. Among these paths, a shortest return path is selected.

Specifically speaking, the Pb return path connects nodes in sequence of 412-413-414-415-406, the Pc return path connects nodes in sequence of 412-413-416-414-415-407; and the Pd return path connects nodes in sequence of 412-413-416-417-418-415-405.

Since the return paths are in relation of Pb<Pc<Pd, the Pb return path is selected as the optimum return path.

As an alternative, the searched return paths can be displayed to the user in order to allow the user to select his or her preferred return path after comparing distance, time, and other information about the displayed return paths.

When the return path is selected (S308), the main control part 110 guides the moving object to the selected return path (S206 in FIG. 2), eventually helping the user to return on the original driving path.

Therefore, even when the moving object is deviated from the original driving path, the present invention can provide the optimum return path to the user by designating nodes adjacent to a position that is offset the offset constant times the deviated distance, as return points, and by selecting one shortest return path as the optimum return path.

According to the present invention method for searching the return path of the moving object, although the moving object is deviated from the original driving path, the user is provided with the optimum return path to be able to return on the driving path within a short time, and can reuse previously obtained information on the original driving path, traffic information and road works for example.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for searching a return path of a moving object for use in a navigation system, the method comprising:

searching and storing an original driving path of the moving object, and guiding the moving object along the searched driving path;

deciding whether the moving object is deviated from the driving path;

deciding a start point and return points for returning the moving object on the original driving path, when the moving object is deviated from the driving path;

deciding a shortest path as an optimum return path, after searching respective paths from the start point to the return points; and guiding the moving object to the original driving path along the decided return path, wherein the start point of the moving object on a deviated path is a present position of the moving object or a position that a user of the moving object inputs, and the return points include adjacent return points that are a fixed distance between points to to a position that corresponds to a deviation point used as a reference for the driving path of the moving object multiplied by a predetermined constant.

2. The method according to claim 1, wherein the return points of the moving object include at least one node existing on a path from the deviation point of the driving path to a destination.

3. The method according to claim 2, wherein the return points include a last deviation point from the driving path, a deviated distance from the deviation point, and at least one node existing on a digitized map, including at a distant position in a direction from the deviation point of the driving path to the destination by a predetermined multiple of the deviated distance.

4. The method according to claim 1, wherein the optimum return path is decided by searching and storing respective paths that connect the start point of the deviated moving object from the driving path to the return points existing on the driving path, and by deciding a shortest path as the optimum return path.

5. The method according to claim 1, wherein a search result of the return path is provided to the user of the moving object, and on the basis of distance and time information to return on the searched return path from a present position, the user decides a return path.

6. The method according to claim 1, wherein the return path of the moving object is greater than a deviated distance of the moving object, and less than a distance from the deviation point to a destination.

7. The method according to claim 1, searching the respective paths is performed by using GPS position data transmitted from a plurality of GPS satellites, and digitized map data.

8. The method according to claim 1, wherein the guidance of the moving object to the return path comprises:
confirming whether the moving object is returning on the original driving path; and
when the moving object returns on the original driving path, guiding the moving object to continue travel along the original driving path.

9. A navigation system, comprising:
a GPS receiving means for receiving position data transmitted from a plurality of GPS satellites;
a map data storing means for storing digital map data;
a user input means;
a display and a voice output means for providing a user of a moving object with a driving path; and
a main control means for setting a driving path from a present position of the moving object to a destination on the basis of the GPS position data and the digital map data, storing the driving path, guiding the user to the driving path, and when the moving object is deviated from the driving path originally set, for searching and deciding a shortest optimum return path and guiding the user to the decided return path,
wherein the return path is selected among return paths that respectively connects a last deviation point from the driving path due to deviation of the moving object to a set of return points that includes adjacent nodes positioned on the driving path, in which the nodes are distant from the deviation point by a predetermined distance and the main control means designates the start point of the moving object on the deviated path as a present position of the moving object or a position the user of the moving object inputs.

10. A navigation system, comprising:
a GPS receiver configured to receive position data transmitted from a plurality of GPS satellites;
a map data memory configured to store digital map data;
a user input unit configured to receive user input;
a display and a voice output unit configured to provide a user of a moving object with a driving path; and
a main control processor configure to set a driving path from a present position of the moving object to a destination on the basis of the GPS position data and the digital map data, to store the driving path, to guide the user to the driving path, and when the moving object is deviated from the driving path originally set, to search and decide a shortest optimum return path and guiding the user to the decided return path,
wherein the return path is selected among return paths that respectively connects a last deviation point from the driving path due to deviation of the moving object to a set of return points that include adjacent nodes positioned on the driving path, in which the nodes are distant from the deviation point by a predetermined distance and the main control processor designates the start point of the moving object on the deviated path as a present position of the moving object or a position the user of the moving object inputs.

* * * * *